United States Patent
Walker et al.

(10) Patent No.: US 7,513,207 B2
(45) Date of Patent: Apr. 7, 2009

(54) GATING FOR CLEATS

(75) Inventors: Sarah L. Walker, Welwyn Garden (GB); Julian R. Emery, Welwyn (GB)

(73) Assignee: Clamcleats Limited, Hertfordshire (GB)

( * ) Notice: Subject to any disclaimer, the term of this patent is extended or adjusted under 35 U.S.C. 154(b) by 0 days.

(21) Appl. No.: 11/266,419

(22) Filed: Nov. 3, 2005

(65) Prior Publication Data
US 2006/0102059 A1 May 18, 2006

(30) Foreign Application Priority Data
Nov. 4, 2004  (GB) ................. 0424473.7

(51) Int. Cl.
*B63B 21/04* (2006.01)
*B63B 17/00* (2006.01)
*B66D 3/04* (2006.01)

(52) U.S. Cl. .................. 114/218; 114/343; 254/391

(58) Field of Classification Search .............. 114/218, 114/343; 254/391
See application file for complete search history.

(56) References Cited

U.S. PATENT DOCUMENTS

| | | | |
|---|---|---|---|
| 3,574,900 A | 4/1971 | Emery | |
| 3,765,061 A | 10/1973 | Nash | |
| 3,965,544 A | 6/1976 | Boden | |
| 4,109,603 A * | 8/1978 | Guthmann | 114/230.29 |
| 4,162,561 A | 7/1979 | Tillemans | |
| 5,675,872 A | 10/1997 | Emery | |
| 5,987,711 A | 11/1999 | Parsons | |
| 6,094,783 A | 8/2000 | Parsons | |
| 6,115,889 A | 9/2000 | Mickelson | |
| 6,260,498 B1 * | 7/2001 | Cochran | 114/218 |
| 6,722,303 B2 | 4/2004 | Lob et al. | |
| 6,857,381 B2 * | 2/2005 | Siewert et al. | 114/218 |
| 2003/0228807 A1 | 12/2003 | Mellow et al. | |

FOREIGN PATENT DOCUMENTS

| | | |
|---|---|---|
| BE | 900151 | 11/1984 |
| GB | 2046826 | 11/1980 |
| GB | 2092216 | 8/1982 |

OTHER PUBLICATIONS

Harken, Cam Fairleads, http://www.harken.com/hardware/cmfrld.php.
Holt, Pro-Leads, http://www.holtperformance.com/cleats/detail.asp?line=prolead.

* cited by examiner

*Primary Examiner*—Lars A Olson
*Assistant Examiner*—Daniel V. Venne
(74) *Attorney, Agent, or Firm*—Andrus, Sceales, Starke & Sawall, LLP

(57) ABSTRACT

A cleat assembly comprising two wall-defining members 12, 14 between which an elongate element to be gripped can be inserted and a gate 40, 42. Each wall-defining member defines at least one ridge 30, 32 for gripping an elongate element. The gate 40, 42 controls entry of elongate element between the ridges. The gate is movable to a condition in which an elongate element is permitted to enter between the ridges by a pressing force applied via the elongate element.

24 Claims, 5 Drawing Sheets

GATING FOR CLEATS

CROSS REFERENCE TO RELATED APPLICATION

This application claims priority to Great Britain Application No. 0424473.7, filed Nov. 4, 2004.

The invention relates to cleats and, in particular, to gating for controlling entry to the gripping portion of a cleat.

A so-called jamming cleat comprises two opposed side members that are fixed opposite one another such that facing walls they define form a generally V-shaped groove. The facing walls are each provided with one or more ridges that, in the lengthways direction of the groove, are upwardly inclined towards the rear end of the groove. An elongate element, such as a rope, is cleated by bringing it down into the groove while pulling in the rearward direction and thus applying a tensile force acting towards the front end of the groove. The arrangement of the ridges is such that a tensile force acting towards the front end of the groove will cause the rope to move further down into the groove, thus firmly restraining the rope. An example of such a cleat is disclosed in GB 2 046 826 (Clamcleats Ltd).

A problem with this type of cleat is that ropes can catch in the cleat when not required. Additionally, with certain designs of cleat and certain mounting positions (for example, when mounted with the groove facing downwards), a rope can work loose from between the ridges, especially when there is only a light load on the rope. This is potentially dangerous and may limit the application of cleats so affected.

It is an object of the invention to at least partially alleviate one or both said problems or, at least, to provide an alternative to existing rope holding products.

The invention provides a cleat assembly comprising: a cleat comprising two wall-defining members arranged in fixed spaced relation to define a groove having a longitudinal axis and into which an elongate element can be inserted, each said wall defining member being provided with at least one inclined ridge between which ridges an elongate element inserted into the groove can be gripped; and gating for controlling entry of an elongate element between said ridges, said gating being movable to at least one condition that permits an elongate element to enter between the ridges by a pressing force applied via the elongate element.

The invention includes a cleat assembly comprising: a cleat comprising two wall members disposed in fixed opposed relation and defining a generally V-shaped groove therebetween that extends in a lengthways direction of the cleat, said groove having a leading end and a rear end and at least one ridge on each side thereof, said ridges being upwardly inclined away from said leading end towards said rear end for gripping an elongate element therebetween; and respective resilient gate members associated with said wall members, said gate members comprising respective gate defining portions disposed over said groove and being movable away from one another by a force applied by an elongate element pressed against them to permit the elongate element to be inserted between said ridges.

The invention includes a cleat assembly comprising: a cleat comprising two wall-defining members arranged in fixed spaced relation to define a groove having a longitudinal axis and into which an elongate element can be inserted, each said wall defining member being provided with at least one inclined ridge between which ridges an elongate element inserted into the groove can be gripped; and gating for controlling exit of an elongate element from between said ridges, said gating being movable to at least one condition that permits an elongate gate element to exit from between the ridges by a pressing force applied via the elongate element.

The invention includes a gate device for a jamming cleat, said device comprising a transverse base member having respective side members extending from opposite sides thereof and defining a space therebetween for receiving a jamming cleat and gate portions extending transversely from said side members so as to be disposed over said space and being separable by a force applied by an elongate element pressed against them to permit said elongate element to pass between them for insertion in a jamming cleat received in said space.

The invention includes a method of controlling insertion of elongate elements between opposed gripping ridges of a jamming cleat, said method comprising providing gating having a closed position that prevents insertion of an elongate element between the ridges, which gating can be opened by applying a force thereto via said elongate element.

The invention includes a method of controlling release of elongate elements gripped between opposed gripping ridges of a jamming cleat, said method comprising providing gating having a closed position that prevents an elongate element gripped between said ridges from exiting from between said ridges, which gating can be opened by applying a force thereto via said elongate element.

In order that the invention may be well understood, some embodiments thereof, which are given by way of example only, will now be described, with reference to the drawings, in which.

Figure 1:
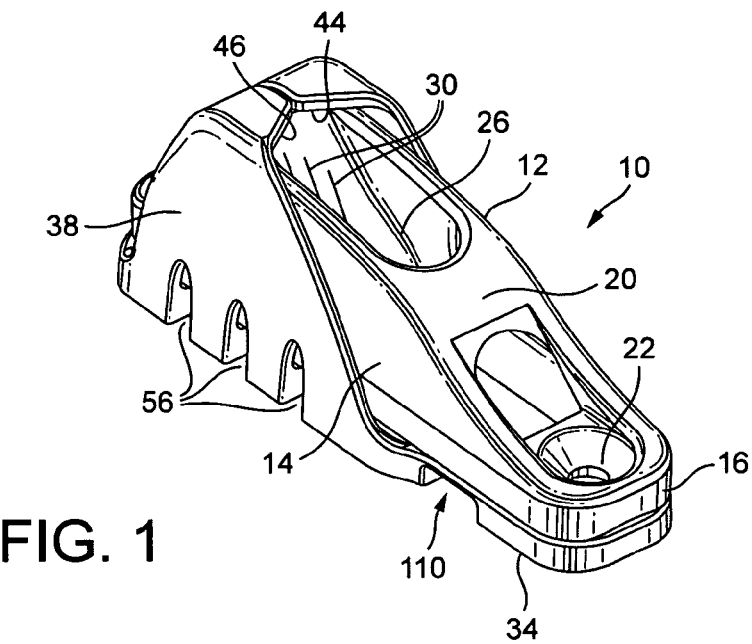
FIG. 1 is a perspective view of a cleat assembly according to the invention.
Figure 2:
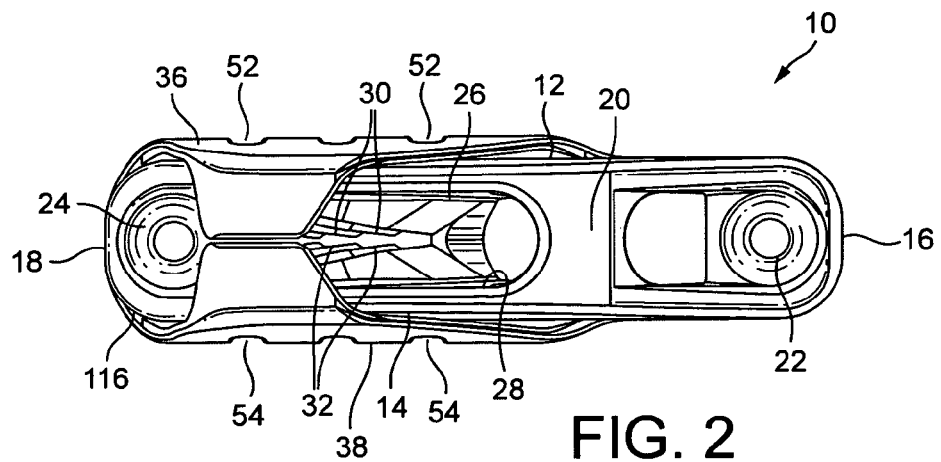
FIG. 2 is a plan view of the cleat assembly.
Figure 3:
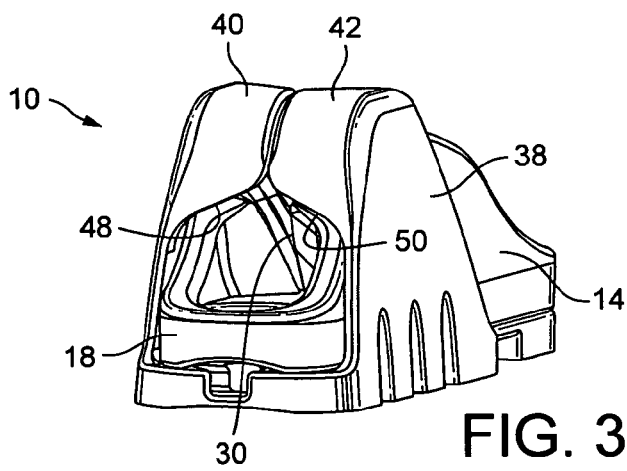
FIG. 3 is a perspective view from the rear of the cleat assembly.

Referring to FIGS. 1 to 3, a cleat assembly 10 comprises a cleat that has two side members 12, 14 interconnected by a front base portion 16, a rear base portion 18 and an upper bridge portion 20. The base portions 16, 18 are provided with respective countersunk holes 22, 24 to permit the cleat to be fastened to a surface. However, it is not essential the holes 22, 24 are countersunk.

The side members 12, 14 have respective inwards facing walls 26, 28 that are opposite one another and define a groove therebetween. The walls 26, 28 are inclined upwardly and laterally away from the longitudinal axis of the cleat so that the groove is generally V-shaped, with the narrowest portion of the V at the base of the cleat. The walls 26, 28 are each provided with a series of ridges 30, 32 that are inclined in the lengthways direction of the cleat. The lower end of the ridges 30, 32 are positioned closer to the leading, or front end of the cleat, as defined by the front base portion 16, than the upper ends, which are positioned closer to the rear end of the cleat, as defined by the rear base portion 18. Thus, in the lengthways direction of the cleat, the ridges 30, 32 are inclined upwardly and away from the leading end of the cleat. The ridges 30, 32 are preferably approximately V-shaped in cross-section.

The cleat is seated on a base member 34 that has a footprint corresponding substantially to that of the cleat. The base member 34 has holes that are aligned with the countersunk holes 22, 24. A pair of resilient gate supports 36, 38 extend upwardly from the base member 34. The gate supports are relatively thin and arranged to extend adjacent the outer sides of the respective side members 12, 14. Each gate support 36, 38 has a transverse gate part 40, 42 that extends generally perpendicular to the plane of the respective side member 12, 14. The gate parts 40, 42 are shaped to follow the contour of the upper edges of the side members 12, 14 and extend to meet one another along the cleat axis.

The leading ends 44, 46 of the gate parts, that is those disposed closest to the front base portion 16, are inclined away from the front base portion 16 towards the cleat axis so as to define a tapering lead-in to the line along which the gate parts meet. Similarly, the rear edges 48, 50 of the gate parts are inclined towards the cleat axis so as to define a tapered lead-in to the line along which the gate parts meet.

The resilient gate supports 36, 38 are each provided with an aligned series of apertures 52, 54 that are contiguous with recesses 56 defined in the base member 34. The openings defined by the combined apertures 52, 54 and recesses 56 serve to allow water to escape from between the resilient gate supports 36, 38 and the cleat side members 12, 14 when the cleat is used, for example, in marine applications.

The cleat may be made of any material sufficiently strong to withstand the forces it is designed to support. Plastics or a suitable metal may be used. The base member 34, gate supports 36, 38 and gate parts 40, 42 may be made from any suitable metal or plastics material. In a presently preferred embodiment, the base member 34, gate supports 36, 38 and gate parts 40, 42 are an integral plastics moulding made by an injection moulding process.

In use, an elongate element, such as a rope, is threaded over the front base portion 16 and under the bridge portion 20 and then laid over the top of the gate parts 40, 42. It can be seen that between them, the front base portion 16 and the upper bridge portion 20 define fairlead for ropes that are to be received between the walls 26, 28. The rope thus positioned is aligned with the cleat and ready for use. When the user wishes to secure the rope in the cleat, the rope is gripped at its end and pulled away from the leading end of the cleat and downwardly into the groove defined between the walls 26, 28. Initially, this pushes the rope into the gap between the leading edges 44, 46 of the gate parts, thus, applying a force to the gate parts that causes them to move apart and so permit the rope to enter the groove where it is gripped between the ridges 30, 32.

It will be appreciated that the gate parts 40, 42 prevent the rope from entering between the ridges 30, 32 until such time as the user applies sufficient force to the rope to move the gate parts apart. Until that force is applied, the rope will lie on the gate parts and cannot accidentally slip into the groove and engage between the ridges 30, 32.

When the rope is to be released, the user pulls on the rope end to apply a force acting away from the leading end of the cleat and at the same time pulls upwards. This moves the rope end into the space between the rear edges of the gate parts 40, 42 causing them to progressively separate and allow the rope to exit the groove. The rear edges 48, 50 of the gate parts are positioned relative to the rear ends of the ridges 30, 32 such that they will prevent an average size of elongate element that the cleat is designed to hold from moving out from between the ridges. Therefore, since it is necessary to apply a force to separate the gate parts 40, 42, the rope cannot accidentally fall out, or work loose, from between the ridges. Thus even if the cleat is mounted with the groove facing downwards and is subject to vibration while the rope is only lightly loaded, the rope will continue to be held by the cleat.

In the embodiment, the gating 40, 42 serves a double function. First, it serves to prevent accidental cleating of the rope and, second, it serves to prevent accidental release of a cleated rope where this might otherwise happen.

Figure 4:
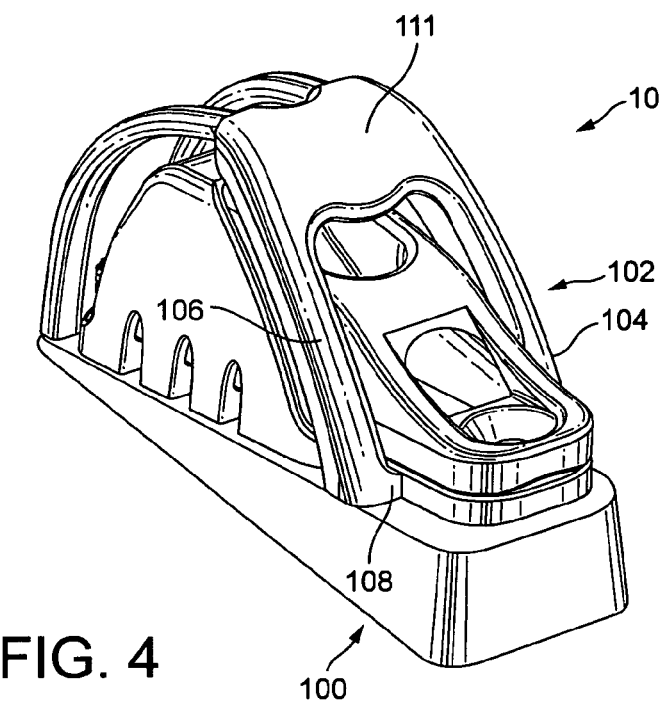
FIG. 4 is a perspective view of the cleat assembly showing parts that may optionally be added.

Referring to FIG. 4, the cleat assembly 10 is additionally provided with an orientation member 100 and a cage 102. These are features that may be optionally added to the cleat assembly, if desired. Preferably, the cleat assembly 10 may be provided with orientation member 100 alone, a cage 102 alone, or with both an orientation member and a cage as shown in FIG. 4.

The orientation member 100 is generally wedge-shaped and serves to lift the leading end of the cleat upwards. Alternatively, by rotating the orientation member through 180°, it may be used to lift the rear end of the cleat. The orientation member 100 may comprise through-holes (not shown) which are aligned with the countersunk holes 22, 24 so as to allow the assembly to be secured to a surface by means of screws or the like. Alternatively, the cleat may be secured to the orientation member 100 and the orientation member provided with separate means to allow it to be secured to a surface. For example, the orientation member could be provided with ears extending from the lengthways extending sides thereof, which ears would have through-holes for screws or the like. It will be understood that the inclination of the orientation member can be selected for a particular intended use and that, in plan, its shape may be adapted to the footprint of the cleat it is intended to be used with. The orientation member 100 is conveniently a plastics moulding but may be made in any suitable conventional manner and any material suitable for its intended use.

Figure 5:
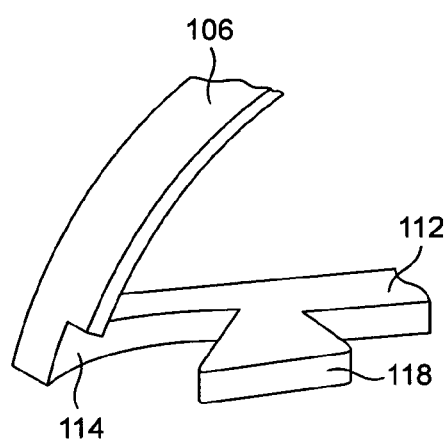
FIG. 5 is a view of a portion of the rear of a cage shown in FIG. 4.

The cage 102 is a plastics moulding shaped to fit over the cleat and gate parts. Although plastics is the currently preferred material, the cage may be made of any suitable metal. It comprises two oppositely disposed legs 104, 106. The legs 104, 106 are arched and connected at their front ends by a transverse member 108. The legs 104, 106 are also connected by a cage bridge portion 111, which is preferably disposed above the groove and forward of, or above, the leading edges 44, 46 of the gate parts. The member 108 is received in a groove 110 (FIG. 1) defined by the base member 34 so that the cage 102 is held in place by virtue of the member 108 being trapped between the base member 34 and the orientation member 100. In cases where the orientation member is not used, the member 108 will be trapped between the base member 34 and the surface to which the cleat assembly 10 is secured. The arched legs 104, 106 extend in the lengthways direction of the cleat and are connected by a rear transverse member 112 (FIG. 5). The lower end of each leg 104, 106 includes a recess 114 for receiving a rear end portion 116 (FIG. 2) of the base member 34. A generally triangular tab 118 projects forwardly from the rear transverse member 112 in the lengthways direction of the cage 102. The tab 118 fits in a correspondingly shaped notch (not shown) in the rear end of the base member 34. When the cleat is in place, its rear end sits over the tab 118 preventing it from lifting out of the notch.

It will be appreciated that the engagement of the tab 118 in the notch limits lateral movement of the cage relative to the cleat and base member 34.

Referring to FIG. 1, it will be seen that the groove defined between the walls 26, 28 is open at its upper end between the upper bridge portion 20 and the leading edges 44 of the gate parts 40, 42. This arrangement allows considerable movement of a rope that is threaded between the front base portion 16 and upper bridge portion 20 so that it may not overlie the groove when a user wishes to cleat it. The arrangement of the cage bridge portion 111 is such that it partially closes the upper end opening of the groove so that the rope is not free to wander. The rope will, thus, be correctly positioned just ahead of the gate parts 40, 42 to permit rapid cleating. It will be appreciated that the configuration of the cage can be adapted to the shape of the cleat and gate it is to be used with, so as to provide an opening sufficient for the size of rope the cleat assembly is intended to be used with.

It will be appreciated that by providing a separate cage to restrict the groove opening, it is possible to adapt the usage of the cleat assembly without having to modify the cleat so that the groove opening of the cleat can be kept relatively large. It will also be appreciated that the cage 102 can be used with cleats, such as that disclosed by GB 2 046 826 (Clamcleats Ltd) that do not have an upper bridge portion and, thus, provide such cleats with a fairlead and so adapt them for uses in which it is wished to pre-position a rope in the cleat groove.

Figure 6:
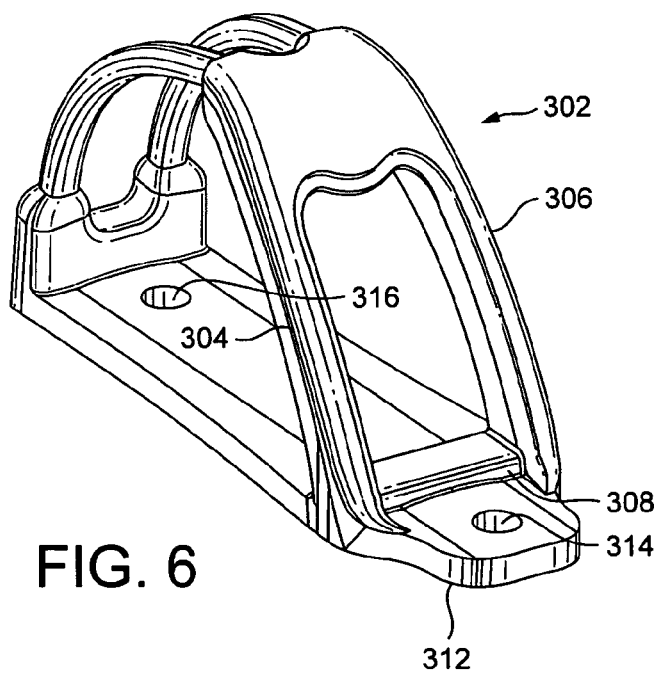
FIG. 6 is a perspective view of another example of a cage.
Figure 7:
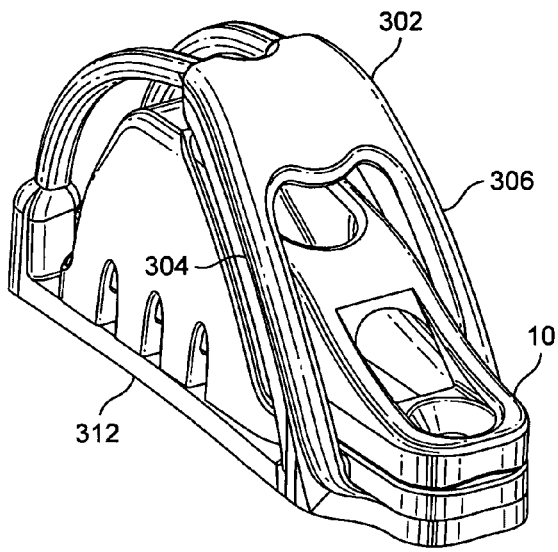
FIG. 7 is a perspective view of the cage of FIG. 6 added to the cleat assembly of FIGS. 1 to 3.

Another example of a cage is illustrated in FIG. 6. The cage 302 comprises two oppositely disposed legs 304, 306. The legs 304, 306 are arched and are connected by a cage base 312, such that the cage 302 fits around the cleat and base member 34 as shown in FIG. 7. The cage base 312 comprises a transverse member 308, which is arranged to be received in a groove 110 (FIG. 1) defined by the base member 34. The cage base 312 also comprises through-holes 314, 316 which are aligned with the holes 22, 24 of the cleat assembly 10, so as to allow the assembly to be secured to a surface by means of screws or the like. Thus, the cage 302 is held in place by virtue of the cage base 312 being trapped between the base member 34 and the surface to which the cleat assembly 10 is secured. The cage base 312 limits lateral movement of the cage 302 relative to the cleat and base member 34, without the use of a cooperating notch and tab arrangement as used by the cage 102 shown in FIGS. 4 and 5.

Figure 8:
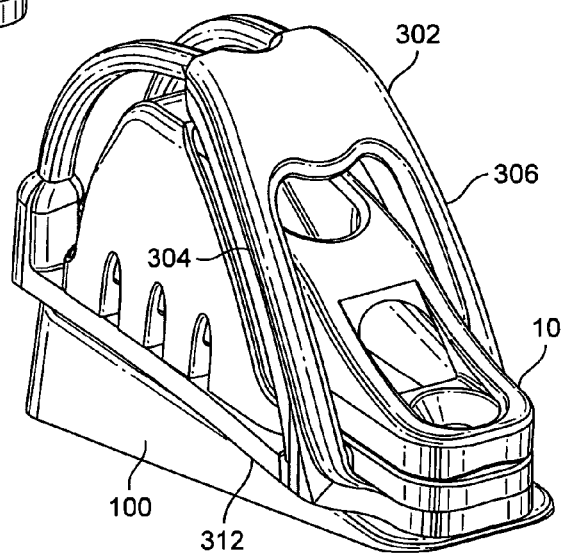
FIG. 8 is a perspective view of the cage and cleat assembly shown in FIG. 7 attached to an orientation member.

The cage 302 may also be used in conjunction with an orientation member 100, as shown in FIG. 8. The through-holes 314, 316 of the cage align with the holes 22, 24 of the cleat assembly and the through-holes (not shown) of the orientation member 100, thereby allowing the assembly to be secured to a surface. In this case, the cage 302 is held in place by virtue of the cage base 312 being trapped between the base member 34 and the orientation member 100.

The cage 302 is preferably a composite plastics and metal part, but may be made solely of any suitable metal or plastics material.

The invention is not limited to cleats such as the cleat shown in FIGS. 1 to 4 that are configured such that the groove is adjacent the base of the cleat. The invention may be applied to any form of jamming cleat, for example the cleat 200 shown in FIG. 9, which is similar to the CL 255 cleat made by Clamcleats Ltd.

The cleat 200 comprises two side walls 202, 204, which are connected by a transverse front wall 206. The front wall 206 is inclined from its lower end towards the rear of the cleat. Each wall 202, 204 has an ear 208, 210 extending laterally outwardly therefrom. Each ear 208, 210 defines a countersunk hole 212, 214 so that the cleat can be fastened to a surface by screws or other suitable fasteners.

The lower end of the front wall 206 is disposed above the lower ends of the side walls 202, 204 so as to define an opening 216 leading into a groove, or slot, 218 defined by the inner faces of the side walls. The groove 218 is open at its upper end and each side wall is provided with three ridges 220 adjacent the upper end opening. The lowermost of the three ridges is the shortest, in that it projects the shortest distance from the front wall 206 and the uppermost ridge is the longest.

Gating for this cleat is shown by dashed lines. The gating comprises gate portions 222, 224 having opposed edges that meet along the longitudinal axis of the cleat. The gate portions 222, 224 are supported by respective resilient gate supports 226, 228. The resilient gate supports extend alongside the side walls 202, 204 and terminate in transversely extending tabs 230, 232 that fit into respective recesses at the rear end of the side walls 202, 204. When the cleat is secured to a surface, the tabs 230, 232 are trapped between the surface and the recesses, thus securing the gating arrangement relative to the cleat. As shown, the tabs 230, 232 extend approximately perpendicular to the side walls 202, 204. Preferably, prior to fitting to the cleat, the tabs would be inclined upwardly (as viewed in the drawing).

It will be appreciated that instead of fixing by tabs 230, 232, the gating 222, 224 could be supported on a base member in the same way as in the embodiment shown in FIGS. 1 to 4.

In use, an elongate element, such as a rope, is inserted through the opening 216 and passed through the groove 218 such that its free end lies to the rear of the cleat 200. When the rope is to be cleated, the user grasps the end projecting from the rear of the cleat and pulls it forwardly and upwardly (as viewed in FIG. 9). This applies a pressing force to the gate portions 222, 224 causing them to separate and allowing the rope to pass between them and enter between the ridges 220 where the rope is gripped by the ridges. The rope can be released by reversing this process.

Figure 9:
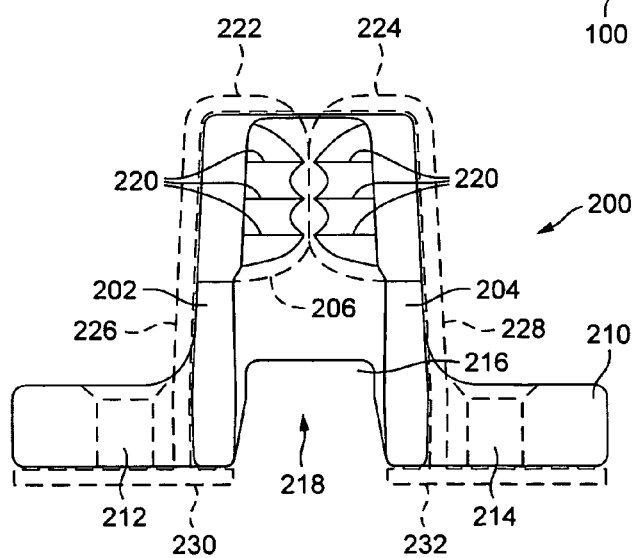
FIG. 9 is a rear elevation view of another cleat assembly according to the invention.
Figure 10:
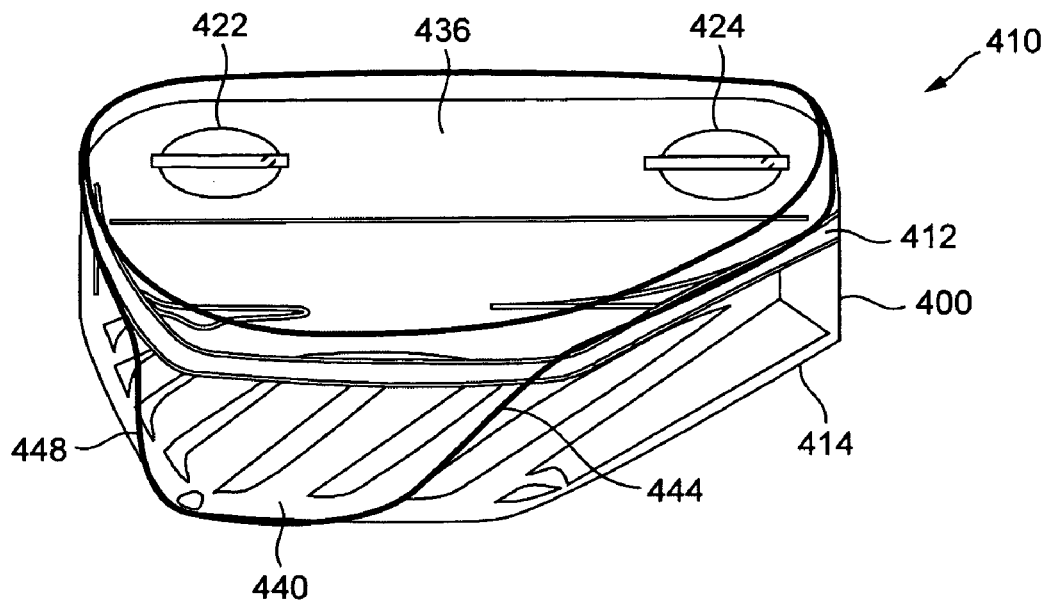
FIG. 10 is a perspective view of a further cleat assembly according to the invention.
Figure 11:
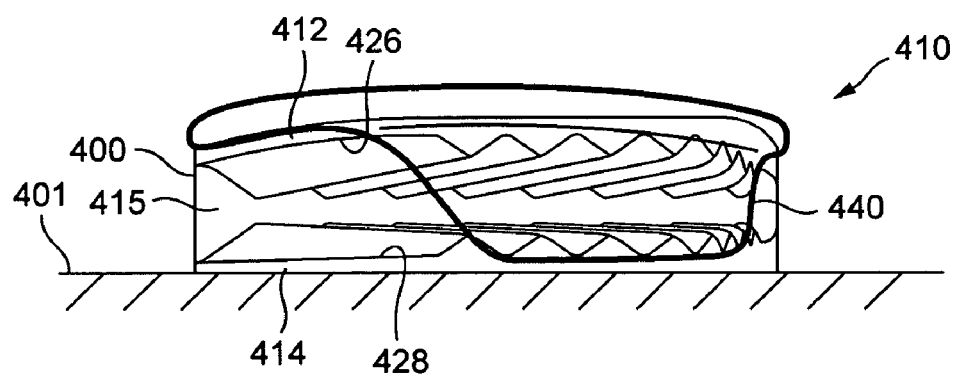
FIG. 11 is a plan view of the cleat assembly of FIG. 10.
Figure 13:
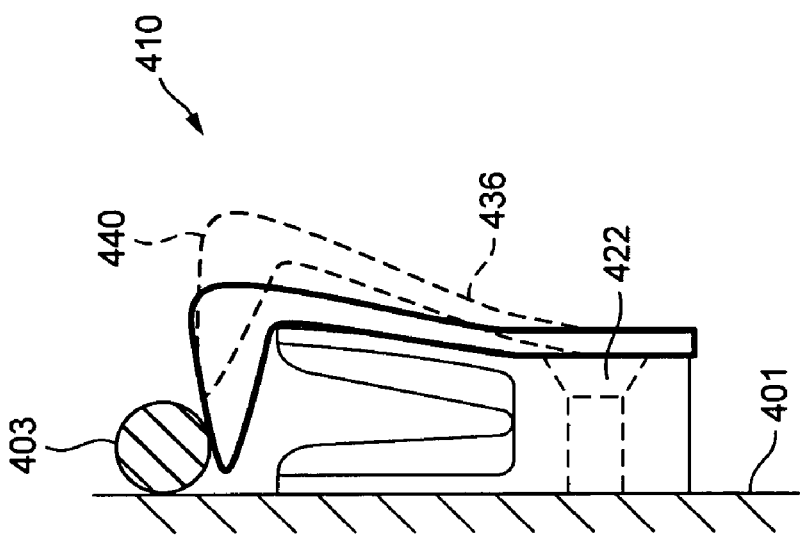
FIG. 13 is a cross-section through the line A-A indicated in FIG. 12.

As with the gating shown in FIGS. 1 to 4, the gating shown in FIG. 9 prevents a rope from entering between, or falling out from between the ridges 220, other than when a user applies sufficient force to the rope to cause the gating to open. It will be appreciated that in this embodiment, the gating will be most valuable in preventing the rope from dropping from between the ridges when the rope is lightly loaded and subject to vibration.

A further example of a type of cleat to which the invention may be applied is shown in FIGS. 10 to 13, in which cleat 400 is similar to the CL 206 or CL 207 cleats made by Clamcleats Ltd.

A cleat 400 comprises two side members 412, 414 interconnected by a base portion 415. The side members 412, 414 have respective inwards facing walls 426, 428 that are opposite one another and define a groove therebetween. The walls 426, 428 are inclined and comprise a series of inclined ridges similarly to the cleat shown in FIG. 1 to 4.

The base portion comprises two holes 422, 424 to permit the cleat 400 to be fastened to a surface, the axis of the holes being substantially mutually perpendicular to the side members 412, 414 and the length of the groove. Thus the cleat is arranged such that the side members are aligned substantially parallel to the surface 401 to which the cleat is secured, in contrast to the cleats shown in FIGS. 1 to 4 and 7 to 9 which are arranged such that their side members are aligned substantially perpendicular to the surface to which they are secured.

A cleat assembly 410 comprises a cleat 400 attached to a gate, the gate comprising a resilient gate support 436 and a transverse gate part 440. The gate may be integrally formed with the cleat, but is preferably a discrete component that can be attached to the cleat, for example by means of screws (or the like) passing through through-holes (not shown) in the gate support 436 and the holes 422, 424 of the cleat 400. The cleat 400 and gate can be formed from any suitable metal or plastics material.

In contrast to the cleat assemblies shown in FIGS. 1 to 4 and 7 to 9, the cleat assembly of FIGS. 10 to 13 comprises just one gate. The gate is arranged such that the gate support 436 is disposed on the side of the cleat 400 that is remote from the surface 401 to which the cleat is to be secured. The transverse gate part 440 extends substantially across the width of the groove, or at least sufficiently far across the width of the groove so as to leave a gap that is sufficiently small as to enable gating of the smallest rope that the cleat is intended to be used with. As shown by the broken lines in FIG. 13, the transverse gate part 440 can move laterally (that is, in a direction substantially perpendicular to the surface 401 and the side members 412, 414) by virtue of resilient deformation of the gate support 436.

Figure 12:
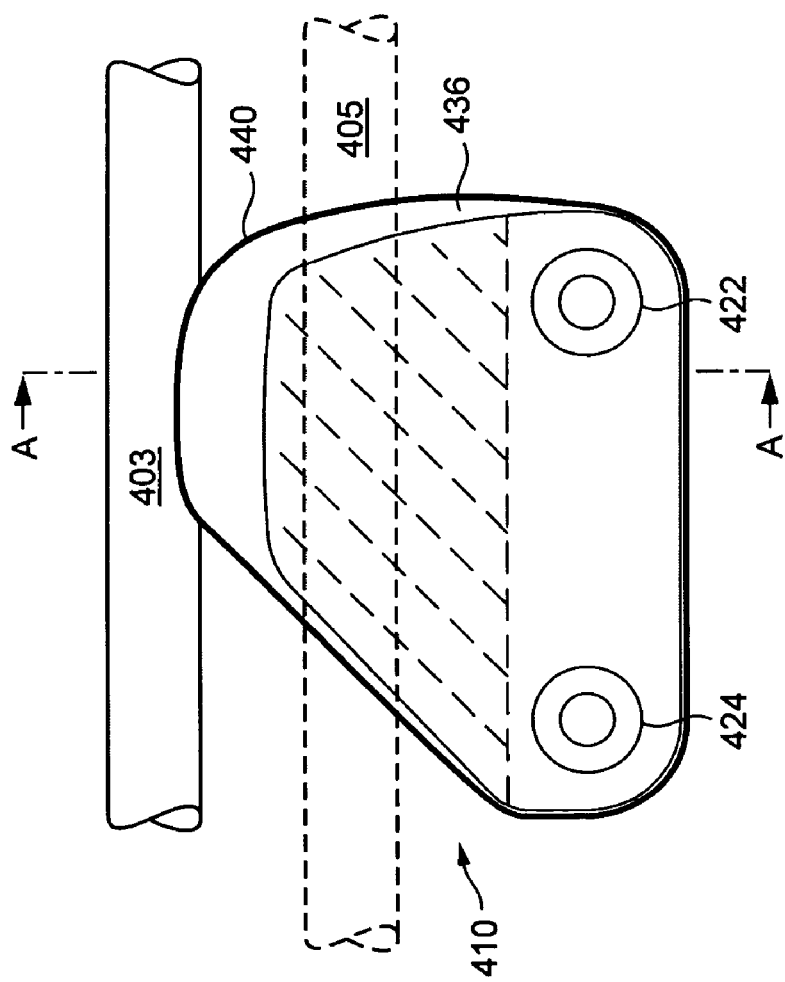
FIG. 12 is a side elevation of the cleat assembly of FIGS. 10 and 11.

The leading end 444 and rear end 448 of the transverse gate part 440 taper away from the gate support 436 and towards the surface 401, such that the force exerted upon a respective end when a rope 403 (or other elongate element) is secured or released from the cleat in the manner previously described (in relation to the example shown in FIGS. 1 to 3) causes the transverse gate member 440 to be urged laterally. Lateral urging causes the gate member 440 to move away from the surface 401 and away from the side member closest to the surface, allowing the rope 403 to pass between the side of the gate member and the surface such it can be inserted into or removed from the groove. In the absence of such forces, the transverse gate member 440 remains (via resilient biasing from the gate support 436) in a position in which the groove is substantially occluded, thereby preventing rope 403 being accidentally inserted into or released from the groove. A cleated rope is indicated in FIG. 12 by broken lines and the reference sign 405.

Thus, by providing a single gate extending from only one side of the cleat, it is possible to provide gating for a cleat that is arranged to be secured to a surface in a manner such that the other side of the cleat (that is, the side remote from the gate) is in contact with the surface. Similar single gate arrangements may also be used with other types of cleat, including the cleat illustrated in FIGS. 1 to 3.

It will be appreciated that the use of gating is not restricted to cleats that are intended to be fixed when in use. It is known to mount cleats in a support such that they can pivot about an axis extending perpendicular to the cleat axis. In this case, gating may be secured to the cleat so that it pivots with the cleat. Alternatively, a gate arrangement could be provided immediately to the rear of the cleat. In this case, the gate parts can be supported on respective resilient legs positioned behind the cleat and projecting from the base of the support.

Cleats can also be rigged on a rope so that they are suspended in mid-air. An example of such a cleat is the CL 253 Trapeze cleat made by Clamcleats Ltd. In this case a gate arrangement can be fixed to the base portion of the cleat.

It will be appreciated that the gate parts do not have to meet along the cleat axis. They may meet offcentre, or there may be a gap between them. Where there is a gap, this should be smaller than the smallest rope the cleat is intended to be used with.

It will be understood that where the gate portions are supported on a base member, such as the base member 34, the shape of the base member does not have to correspond to the footprint of the cleat. It may, for example, have transversely extending ears that each have screw holes that permit the base member to be secured to a surface by screws or the like.

The gating may be secured to the cleat by snap-fitting. Similarly, the cage could be configured to be mounted on a cleat by snap-fitting.

It will be understood that the gate parts do not need to be clamped in position by the cleat. They could, instead, be secured to the cleat.

It will be understood that the gate parts do not have to be mounted on resilient supports as in the embodiments. Instead, the gate parts may be mounted on hinge members that are biassed, for example by a simple leaf spring, so that the gate arrangement is normally closed. The leaf spring may be a simple resilient member projecting from a base, similar to the base member 34.

It will be understood that the cleat assembly may be supplied whole, or parts may be supplied separately for retrofitting to existing cleats. In particular, the gating can readily be supplied separately to be fitted with previously installed cleats.

It will be appreciated that although the cleats in the embodiments have a plurality of ridges on each side of the groove, this is not essential and there may be just one ridge on each side.

The invention claimed is:

1. A cleat assembly comprising: a cleat comprising two wall-defining members fixed opposite one another to define a groove having a longitudinal axis and into which an elongate element can be inserted, the groove having a generally V-shaped cross-section, each said wall defining member being provided with at least one ridge that is substantially inclined towards a rear end of the groove and between which ridges an elongate element inserted into the groove can be gripped; and gating for controlling entry of an elongate element between said ridges, said gating being arranged to provide a closed condition that prevents insertion or release of an elongate element between the ridges, and said gating being movable from said closed condition to at least one condition that permits an elongate element to enter between the ridges by a pressing force applied via the elongate element.

2. A cleat assembly as claimed in claim 1, wherein said gating is resiliently biased to the closed condition.

3. A cleat assembly as claimed in claim 2, wherein said gating comprises two gate members arranged in opposed relationship and having opposed edges positioned relative to said wall-defining members so as to prevent insertion of said elongate element between said ridges, said opposed edges of the gate members being movable away from one another to permit said elongate element to pass therebetween to permit entry of the elongate element between said ridges.

4. A cleat assembly as claimed in claim 3, wherein respective portions of said edges disposed closest to a front end of the cleat are inclined with respect to said longitudinal axis such that they are progressively closer to one another away from said front end.

5. A cleat assembly as claimed in claim 3, wherein respective portions of said edges disposed closest to a rear end of the cleat are inclined with respect to said longitudinal axis such that they are progressively closer to one another away from said rear end.

6. A cleat assembly as claimed in claim 5, wherein respective portions of said edges disposed closest to a front end of the cleat are inclined with respect to said longitudinal axis such that they are progressively closer to one another away from said front end.

7. A cleat assembly as claimed in claim 3, wherein said edges each have a length and said edges meet along said axis for at least a portion of said length.

8. A cleat assembly as claimed in claim 3, wherein said wall-defining members are disposed between said gate members.

9. A cleat assembly as claimed in claim 8, wherein said wall-defining members have an outer face and said gate members each comprise a hinge portion extending adjacent a respective said outer face.

10. A cleat assembly as claimed in claim 9, wherein said hinge portions each comprise a flexible member by which the gating is resiliently biased to said closed condition.

11. A cleat assembly as claimed in claim 9, wherein each said gate member comprises a gate portion extending transverse to said hinge portion and above said groove, said gate portions defining said edges.

12. A cleat assembly as claimed in claim 11, wherein said wall defining members each have an edge surface extending in the direction of said longitudinal axis and defining an opening leading to said groove and said gate portions extend over the respective edge surfaces and are contoured to substantially correspond to contouring of portions of the edge surfaces over which they extend.

13. A cleat assembly as claimed in claim 3, wherein said gate members are connected by a transverse member, said transverse member defining a base for the cleat.

14. A cleat assembly as claimed in claim 13, wherein at least one aperture is formed in said gate members at respective ends thereof that join said transverse member.

15. A cleat assembly as claimed in claim 14, wherein said apertures extend into respective recesses defined in said transverse member.

16. A cleat assembly as claimed in claim 3, wherein said gate members are secured to the wall-defining members.

17. A cleat assembly as claimed in claim 1, further comprising a cage device that restricts movement of an elongate element relative to said gating.

18. a cleat assembly comprising: a cleat comprising two wall-defining members fixed opposite one another to define a groove having a longitudinal axis and into which an elongate element can be inserted, the groove having a generally V-shaped cross-section, each said wall defining member being provided with at least one ridge that is substantially inclined towards a rear end of the groove and between which ridges an elongate element inserted into the groove can be gripped; and gating for controlling exit of an elongate element from between said ridges, said gating being arranged to provide a closed condition that prevents insertion or release of an elongate element between the ridges, and said gating being movable from said closed condition to at least one condition that permits an elongate element to exit from between the ridges by a pressing force applied via the elongate element.

19. A gate device for a jamming cleat, said jamming cleat comprising two wall-defining members fixed opposite one another to define a groove having a longitudinal axis and into which an elongate element can be inserted, the groove of said jamming cleat having a generally V-shaped cross-section, each wall defining member of said jamming cleat being provided with at least one ridge that is substantially inclined towards a rear end of the groove and between which ridges an elongate element inserted into the groove can be gripped, said gate device comprising a transverse base member having respective side members extending from opposite sides thereof and defining a space therebetween for receiving a jamming cleat and gate portions extending transversely from said side members so as to be disposed over said space, said gate portions being arranged to provide a closed condition that prevents insertion or release of an elongate element between the ridges, and said gate portions being separable from said closed condition by a force applied by an elongate element pressed against them to permit said elongate element to pass between them for insertion in a jamming cleat received in said space.

20. A gate device as claimed in claim 19, wherein said side members are resilient members that will move said gate portions towards one another when said force is removed.

21. A method of controlling insertion or release of an elongate element between opposed gripping ridges of a jamming cleat, said jamming cleat comprising two wall-defining members fixed opposite one another to define a groove having a longitudinal axis and into which an elongate element can be inserted, the groove of said jamming cleat having a generally V-shaped cross-section, each wall defining member of said jamming cleat being provided with at least one ridge that is substantially inclined towards a rear end of the groove and between which ridges an elongate element inserted into the groove can be gripped, said method comprising:
 providing gating having a closed position that prevents insertion or release of an elongate element between the ridges, the gating further having an opened position that allows insertion or release of the elongate element between the ridges;
 moving the gating from the closed position to the opened position by applying a force thereto via said elongate element; and
 inserting or releasing the elongate element between the opposed gripping ridges.

22. A gate device for a cleat, the cleat comprising two wall-defining members fixed opposite one another to define a groove having a longitudinal axis and into which an elongate element can be inserted, the groove having a generally V-shaped cross-section, each said wall-defining member being provided with at least one ridge that is substantially inclined towards a rear end of the groove and between which ridges an elongate element inserted into the groove can be gripped, wherein the gate device comprises a gate support positionable adjacent one of said wall-defining members, and a gate portion extending across the groove from the gate support, wherein said gate support and gate portion from the gate support are arranged to provide a closed position that prevents insertion or release of an elongate element between the ridges, and wherein said gate support and gate portion from the gate support are movable from the closed position by a force applied by an elongate element pressed against the gate portion to permit said elongate element to be inserted into the groove.

23. A gate device as claimed in claim 22, wherein said cleat is arranged to be secured to a surface such that the wall-defining members are parallel to the surface.

24. A gate device as claimed in claim 23, wherein the gate support is adapted to be positioned adjacent the wall-defining member that, in use, is remote from the surface.

* * * * *